United States Patent
Son et al.

(10) Patent No.: US 8,516,513 B2
(45) Date of Patent: Aug. 20, 2013

(54) CASSETTE WITH DISK EJECT MECHANISM

(75) Inventors: Kyquang Son, Dublin, CA (US);
Ravender Goyal, Saratoga, CA (US);
Amir H. Torkaman, Sunnyvale, CA (US); Jamie Nam, Sunnyvale, CA (US);
Michael Szelong, Cupertino, CA (US);
Paul R. Swan, Alameda, CA (US);
Michael Umansky, San Francisco, CA (US)

(73) Assignee: Hitachi-LG Data Storage, Inc., Tokyo (JP)

( * ) Notice: Subject to any disclaimer, the term of this patent is extended or adjusted under 35 U.S.C. 154(b) by 210 days.

(21) Appl. No.: 12/683,296

(22) Filed: Jan. 6, 2010

(65) Prior Publication Data

US 2011/0239241 A1    Sep. 29, 2011

Related U.S. Application Data

(60) Provisional application No. 61/142,819, filed on Jan. 6, 2009.

(51) Int. Cl.
*G11B 23/03* (2006.01)
*B65D 85/30* (2006.01)

(52) U.S. Cl.
USPC ..................................... 720/725; 206/308.1

(58) Field of Classification Search
USPC .............. 720/614, 615, 630, 636–638, 641, 720/725, 728, 732–735, 737–743; 206/308.1, 206/308.2; 360/133; 312/9.1, 9.11, 9.16, 312/9.19–9.23
See application file for complete search history.

(56) References Cited

U.S. PATENT DOCUMENTS 4,728,157 A * 3/1988 David, Jr. ............... 312/9.16
5,917,803 A    6/1999 Goto et al.
6,964,335 B1 * 11/2005 Harris ..................... 206/308.1

FOREIGN PATENT DOCUMENTS

DE        2307410 A  *  8/1974
DE        3008513 A  *  9/1981

OTHER PUBLICATIONS

English translation of the Description portion of DE 2307410 A.*
English translation of the Description portion of DE 3008513 A.*

* cited by examiner

*Primary Examiner* — Nathan Danielsen
(74) *Attorney, Agent, or Firm* — Antonelli, Terry, Stout & Kraus, LLP

(57) ABSTRACT

An optical disk cassette has a disk eject mechanism that ejects a disk such as a DVD or CD. The disk eject mechanism has pushrod, transfer and kick out portions. The pushrod portion slides relative to a side of the cassette case. Pivotally mounted within the case, the kick out portion pushes a disk to eject it from the case. The transfer portion translates pushrod motion to motion of the kick out portion. In a preferred embodiment, the disk eject mechanism is a unitary body, with pushrod, transfer and kick out portions made homogeneously as a single entity, the pushrod portion being a resilient joining elbow. In another preferred embodiment, the disk eject mechanism has a transfer portion that is a rack and a pinion. The rack extends from the pushrod portion and the pinion is attached to or formed as part of the kick out portion.

2 Claims, 3 Drawing Sheets

CASSETTE WITH DISK EJECT MECHANISM

CROSS-REFERENCE TO RELATED APPLICATION

This application claims priority from U.S. provisional application No. 61/142,819, filed Jan. 6, 2009.

TECHNICAL FIELD

The present invention relates to a cassette or cartridge having a mechanism that ejects a disk such as a DVD (Digital Video Disk or Digital Versatile Disk), CD (Compact Disk) or other optical disk.

BACKGROUND ART

Optical disks such as DVDs or CDs are popular for storing and playing entertainment selections including movies, songs and other video and audio performances, as well as reading and writing computer programs and data. Single disk drives and disk changers or multi-play changers abound in consumer and commercial applications.

Early optical disks were often permanently enclosed in cartridges, affording protection of the optical media surface. Early optical disk changers handled multiple cartridges, expanding the amount of data accessible in a given device. Access by a read or read/write head in such a changer was made through a slot in the optical media cartridge. The optical disk was generally not removable from the cartridge.

More recently, optical disks in the form of DVDs or CDs have largely replaced the older optical disks in cartridges. DVD changers and CD changers usually have these disks on a rotatable platter carousel, in a toroidal carousel or stacked in a magazine, although there may be other types of disk changers. Handling the bare disks while loading them in and out of these types of changers exposes the disks to fingerprints, scratching and other types of damage, since the disks are not in a cartridge.

When bare disks are removed from a changer to be put back on a shelf or elsewhere in storage, the user must handle the bare disk and place it back in a storage case, either one in which the disk was originally sold or a replacement case, for example as might occur in a rental store. The process is reversed every time a disk is selected from a shelf for storage and placed into the changer or the magazine for the changer, exposing the disk to damage with each direction and repetition.

Frequent handling of bare disks, and associated damage to them, might also occur in the operation of a movies-on-demand business, where video streams of movies are sent from a server by request to customer Internet addresses. A selection of popular movies is available from a DVD changer at the business location. A worker at that location manually selects a movie from shelves or other long-term storage when a less popular movie is requested by a customer, inserting the disk into the changer to play, and removing it from the changer when done, to return the movie to its shelf or other storage. Periodically, as a movie wanes in popularity, it is removed from the changer and put into storage. Each removal of the disk from its case in order to place it as a bare disk into the changer, and each removal of a bare disk from a changer to put it back into its case for storage risks damage to the disk.

A software-on-demand business, a remote data access and archiving business, an engineering operation such as a design center or scientific operation requiring handling of multiple, large databases with both frequent access and archiving needs might have a similar system. Human workers or robotics, such as a robot arm, could move disks to and from a changer and long-term storage.

Considerable time overhead and cumulative disk damage results from numerous repetitions of removing bare disks from long-term storage cases, moving them and inserting them into a disk changer, removing them from a disk changer, moving them and putting them back into long-term storage cases.

If the disks could remain in cartridges during shelving or other storage, they would be as well protected as in their original cases. If these disks within cartridges could be used in a disk reader or read/write unit, without the need of removing the disk from its storage case and putting it as a bare disk into a reader, read/write unit, changer or magazine for a changer, there would be a savings of time for the user as well as a decreased likelihood of damage of the disk. In combining the protective advantages of a disk within a cartridge and the replaceability of a bare disk that is removable from a cartridge and not permanently encased within it, problems arise as to how to have the disk removable from the cartridge by the user and how to access the disk for reading or writing when the cartridge containing the removable disk is placed in a system.

U.S. Pat. No. 5,917,803, to Goto et al., discloses a disk cartridge adapted for permitting the removal of a disk. The disk cartridge has a case with a disk slot at one end for receiving a disk such as a CD-ROM or other optical disk. An opening is provided so that the disk motor and pickup can be inserted into the disk case in order to rotate and drive the disk. There is a shutter with a shielding plate for opening and closing the opening. The disk remains entirely within the case while the disk motor and pick up rotate and drive the disk. A lid rotates to open and close a disk access for insertion and removal of the disk through the disk slot, as could be done by a user when the cartridge is not within the drive.

SUMMARY

The optical disk cassette has a case that removably houses an optical disk such as a CD or DVD. On the front edge of the cassette case, there is a disk entry/exit slot through which the optical disk is inserted, whereupon it rests or resides in a seating area inside the cassette case, with the optical disk cassette and disk eject mechanism in a disk accepting state. When the optical disk is being ejected from the optical disk cassette, the disk eject mechanism and the optical disk cassette are in a disk ejecting state.

The cassette case has a back edge opposing the front edge, as well as first and second side edges opposite one another. The disk eject mechanism has a pushrod portion, a kick-out portion and a transfer portion.

The pushrod portion is connected to the cassette case and can slide with a pushrod motion parallel to the first side edge. Within the cassette case, the kick out portion has a disk accepting position and a disk ejecting position as well as a range of motion that includes these positions. The transfer portion responds to the pushrod motion of the pushrod portion, and the kick out portion responds to motion of the transfer portion. With these responses, the transfer portion translates the pushrod motion to movement of the kick out portion through the range of motion. In a preferred embodiment of an optical disk cassette with integrated disk eject mechanism, when the kick out portion is in the disk accepting position, it resides between the optical disk and an edge of the cassette case other than the front edge.

In another preferred embodiment of an optical disk cassette with an integrated disk eject mechanism, the disk eject mechanism is a unitary body with pushrod, transfer and kick-out portions. The pushrod portion is partially exposed, has a push end and an opposing transfer end, and moves relative to the side edge of the cassette case. The kick out portion extends into the seating area of the optical disk when it is in the disk ejecting state. A bearing pivotally mounts the kick out portion at a pivot point. The transfer portion is resilient and is a joining elbow or other shape, extending from the transfer end of the pushrod portion and joining the kick out portion at the outer surface of the bearing. In response to movement of the pushrod portion, the transfer portion displaces the kick-out portion between the disk accepting and disk ejecting states.

In another preferred embodiment, the transfer portion is a rack and a pinion. The rack extends from the transfer end of the pushrod portion and has teeth engaging the pinion. The pinion is at least a portion of a toothed gear formed in the outer surface of the bearing of the kick out portion or otherwise attached to the kick out portion, concentric with the bearing. A kick-out device can be a unitary body having a plain bearing and the pinion, all constructed homogeneously. A spring may be located proximate to the rack or elsewhere within the cassette case, to place the disk eject mechanism in a disk accepting state.

DETAILED DESCRIPTION

Figure 1A:
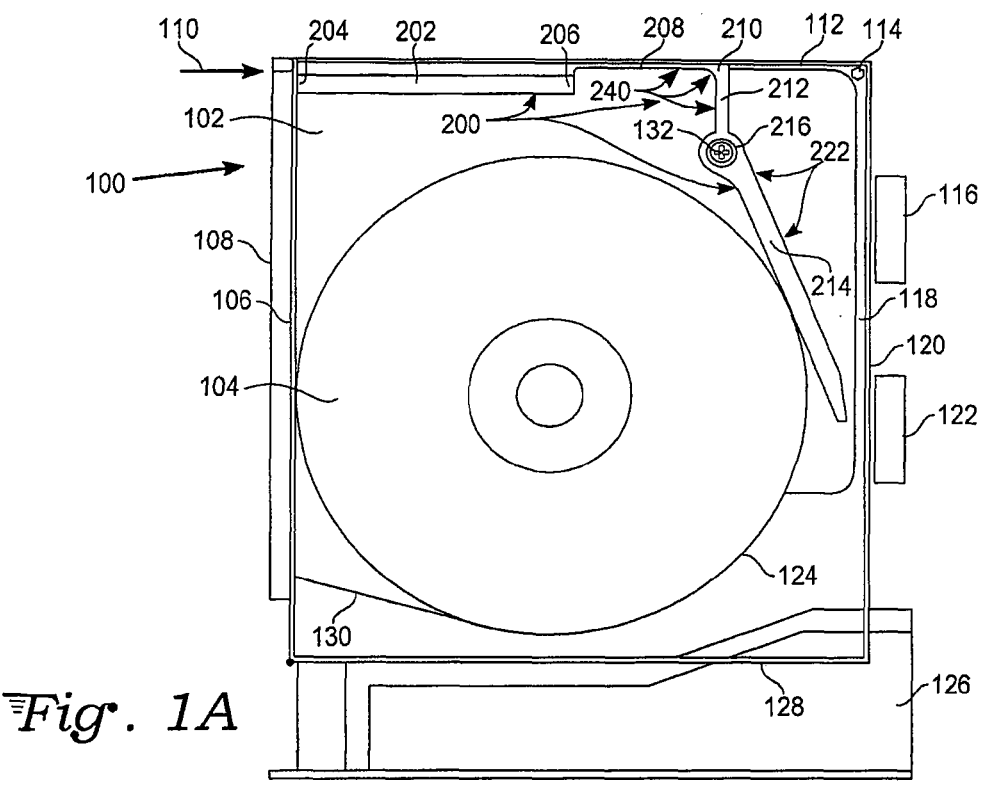
FIG. 1A shows a top view of one preferred embodiment of an optical disk cassette with a disk eject mechanism, in a disk accepting state. An optical disk is fully inserted into the cassette case.

With reference to FIG. 1A, a preferred embodiment of an optical disk cassette 100 with an integrated disk eject mechanism 200 is shown for use with a disk changer designed for manipulating a store of optical disks in which each disk is within a separate cassette. "Cassette" is herein used as a synonym for "cartridge." Although the optical disk cassette can house an optical disk, another type of disk may be used instead. Multiple optical disk cassettes, each with its own built-in eject mechanism, may be arrayed in various configurations, in a modular design that allows for removal or replacement of a given cassette and access to optical disks within the cassettes.

An optical disk 104, such as a DVD or CD, is inserted through the disk entry/exit slot 108 into the optical disk cassette 100, so that the optical disk 104 rests entirely within the cassette case 102. The disk entry/exit slot 108 is along the front edge 106 of the cassette case 102. Opposing the front edge of the cassette case is a back edge 120, and the cassette case also has a first side edge 112 and an opposing second side edge 128. Inserting an optical disk may be performed by a user, in preparation for placing the optical disk cassette into a changer, or by a mechanism within a changer, after a reader or read/write unit within the changer has finished accessing the disk.

A ramp 130 assists in guiding the optical disk 104 during insertion and ejection of the disk. Orienting the optical disk cassette 100 vertically, with the ramp at the bottom, allows the optical disk to roll down the ramp under the influence of gravity upon insertion, although the optical disk cassette operates in other orientations as well. A curved seat 124 assists in seating the optical disk 104 when the disk is at rest within the cassette case 102. The curved seat has a seat extension 118 along the back edge 120 of the cassette case. Fastener 114 secures the seat extension to the cassette case and may secure multiple pieces of the cassette case when the cassette case is not a single piece. The cassette case may be transparent, translucent or opaque and of a material such as plastic or metal. Other materials or types of case construction or fasteners may be substituted by a person skilled in the art. One or more anti-scratching coatings such as polypropylene may be applied to the cassette case or other parts, to prevent optical disk scratching.

Environmental details are also shown in FIG. 1A. Back edge pads 116 and 122 as well as cassette guide 126 seat the optical disk cassette 130, for example in a disk changer.

When the optical disk 104 is at rest within the cassette case 102, the optical disk cassette 100 is in a disk accepting state. In the disk accepting state shown in FIG. 1A, a kick-out arm 214 of a kick-out portion 222 of the disk eject mechanism 200 resides between the optical disk 104 and the back edge 120 of the cassette case, so that it does not interfere with the optical disk at rest within the cassette case. The kick-out arm and the remainder of the disk eject mechanism can be repositioned elsewhere within the cassette case by a person skilled in the art while retaining the essential structure and operation of the preferred embodiment. During insertion of the optical disk into the cassette, the kick out arm and the remainder of the disk eject mechanism may be pushed into its disk accepting state by the disk. Alternatively, the kick out arm and the remainder of the disk eject mechanism without the disk may already be in its disk accepting state prior to insertion of the disk or following a prior ejection of a disk.

Figure 2:
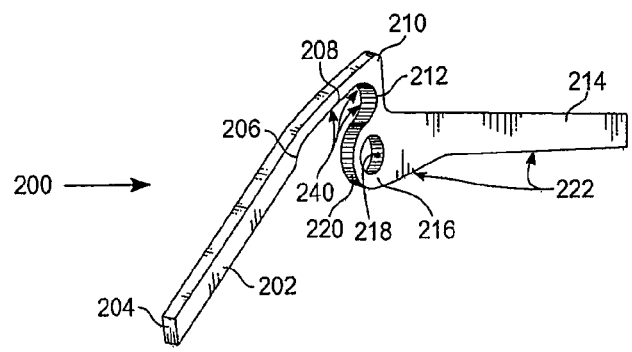
FIG. 2 is an isometric view of the disk eject mechanism of FIGS. 1A and 1B as a unitary body, showing the pushrod portion, the transfer portion and the kick-out portion.

FIG. 2 depicts a preferred embodiment of the disk eject mechanism 200 as a unitary body and the portions thereof. Unitary is herein defined as united or whole. A unitary body is thus a single entity, which may have sections or portions. A unitary body may be made of a single homogeneous material, for example in a mold having one or more sections, producing a body with portions corresponding to the sections of the mold. A method of heterogeneously manufacturing a unitary body is to employ a single mold with sections, pouring a single type of material, a plastic for example, into at least one section and a different type of material, another plastic for example, into at least another section of the mold, thus forming a whole, single entity from different materials. In another method of manufacturing a unitary body heterogeneously, one, several or composite materials may be used in making separate parts, which are then combined into a unitary body to make a whole, single entity.

In a preferred embodiment of an optical disk cassette with an integrated disk eject mechanism as a unitary body, a pushrod portion 202 has a push end 204 and a transfer end 206. A kick-out portion 222 has a kick-out arm 214 and a bearing 216 with an outer surface 220. A transfer portion 240 connects to the transfer end of the pushrod portion. The transfer portion also connects at the opposite end to the kick-out portion at the outer surface of the bearing.

The bearing 216 is a plain bearing, formed in the kick-out portion 222. A plain bearing is herein defined as being made of the same material as the remainder of the part in which it is formed. Other bearings may be substituted.

Figure 1B:
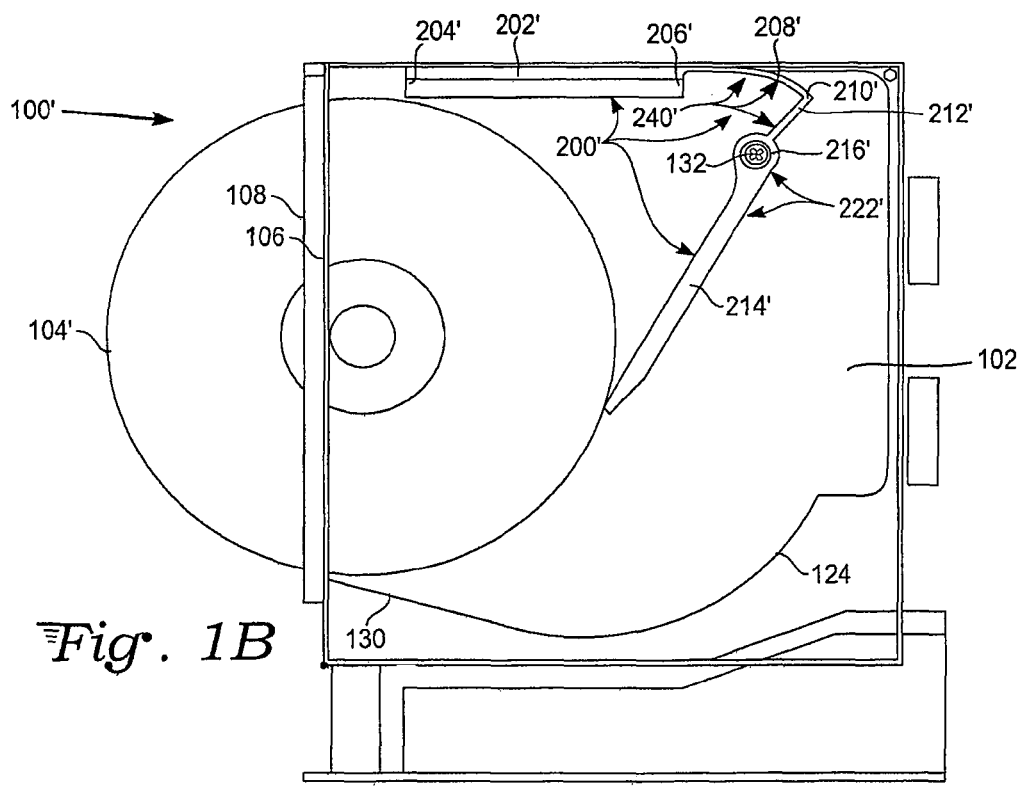
FIG. 1B shows the preferred embodiment of FIG. 1A as the disk eject mechanism ejects the disk. The optical disk cassette and disk eject mechanism are in a disk ejecting state.

In FIG. 1A, the optical disk cassette 100 and the disk eject mechanism 200 are seen in a disk accepting state. In comparison, FIG. 1B shows the optical disk cassette 100' and the disk eject mechanism 200' in a disk ejecting state.

The pushrod portion 202 of the disk eject mechanism 200 slides along the first side edge 112 of the cassette case 102, with pushrod motion 110 parallel to the first side edge. The transfer portion 240 moves in response to pushrod motion of the pushrod portion 202, and the kick-out portion 222 moves in response to motion of the transfer portion. The transfer portion translates the pushrod motion of the pushrod portion to movement of the kick-out portion. The kick-out portion of the disk eject mechanism rotates about a pivot point 132, traveling through a range of motion that includes the disk accepting position of the kick-out portion 222 shown in FIG. 1A and the disk ejecting position of the kick-out portion 222' shown in FIG. 1B.

In operation, pushrod motion 110 of the pushrod portion 202 may be caused by an actuator as part of the internal mechanism of a disk changer or by the application of a tool or the finger of a user. Access to the pushrod portion is gained through the front edge of the cassette, where the pushrod is partially exposed, although the pushrod could be exposed at another location via an aperture in the cassette case 102. A person skilled in the art will recognize that there are various means to cause pushrod motion of the pushrod portion.

The actuator, tool or finger pressing on the push end 204 of the pushrod portion 202 causes pushrod motion 110 of the pushrod portion and initiates ejection of the optical disk 104. To complete ejection of the optical disk, the pushrod portion 202 slides with pushrod motion 110 to the disk ejecting state of the pushrod portion 202', causing the transfer portion 240 to move to the disk ejecting state of the transfer portion 240'. Movement of the transfer portion 240 to the disk ejecting state of the transfer portion 240' causes the kick-out portion 222 to rotate about the pivot point 132, moving from the disk accepting position of the kick-out portion 222 through the range of motion to the disk ejecting position of the kick-out portion 222'. As the kick-out portion moves through the range of motion, the kick-out arm 214 pushes the optical disk 104 from its position at rest within the cassette case 102, until the kick-out arm 214' is in the disk ejecting state and the optical disk 104' protrudes at least partially from the cassette case 102 through the disk entry/exit slot 108 at the front edge 106 of the cassette case 102, completing the ejection operation of the optical disk 104' by the disk eject mechanism 200. It is not necessary for the optical disk 104' to be completely external to the cassette case 102 in order for ejection to have occurred and be considered complete, as means within a disk changer can be employed to further move the optical disk, for example to put the disk into a disk reader or read/write unit.

In each preferred embodiment of the optical disk cassette, the disk eject mechanism has a pushrod portion, a transfer portion and a kick-out portion. A way in which embodiments may differ is in how the transfer portion is implemented. A person skilled in the art may modify the transfer portion to use other means to translate pushrod motion 110 of the pushrod portion 202 to motion of the kick-out portion 222, while retaining the essential structure and operation of the preferred embodiment.

In the FIG. 2 embodiment of the optical disk cassette 100 with disk eject mechanism 200, the disk eject mechanism 200 is a unitary body. The transfer portion 240 extends linearly from the transfer end 206 of the pushrod portion 202, forming a pushrod extension 208. Following this pushrod extension 208, the transfer portion 240 forms an elbow bend 210. The transfer portion 240 extends from the elbow bend, forming a kick-out extension 212 and joining the kick-out portion 222 at the outer surface 220 of the bearing 216. When the disk eject mechanism 200' is in the disk ejecting state as shown in FIG. 1B, the transfer portion 240' flexes. The pushrod extension 208' may bend, the kick-out extension 212' may bend or the angle of the elbow bend 210' may change as the transfer portion 240' flexes, or any combination of bending or flexing of these elements may occur.

In a preferred embodiment, the transfer portion 240 and permissibly the entire disk eject mechanism 200 are made of a resilient material, so that the transfer portion 240' can flex during disk ejection as shown in FIG. 1B and return to the shape and disk accepting position of the transfer portion 240 as shown in FIG. 1A, after ejecting optical disk 104'. As defined herein, a "resilient material" is a material used in making an object or part of an object that returns the object or part to its original form, shape or position after being bent, compressed, stretched or otherwise deformed. In the preferred embodiment, the transfer portion is made of a resilient plastic, however a resilient metal or other material could be used. Other angles may be employed or shapes substituted for the joining elbow 210, the pushrod extension 208, the kick-out extension 212 or any part of or the entirety of the transfer portion 240. A preferred embodiment of an eject mechanism as a unitary body can be made from molding a single piece of plastic or metal homogeneously, or it can be manufactured heterogeneously as a unitary body.

Figure 3:
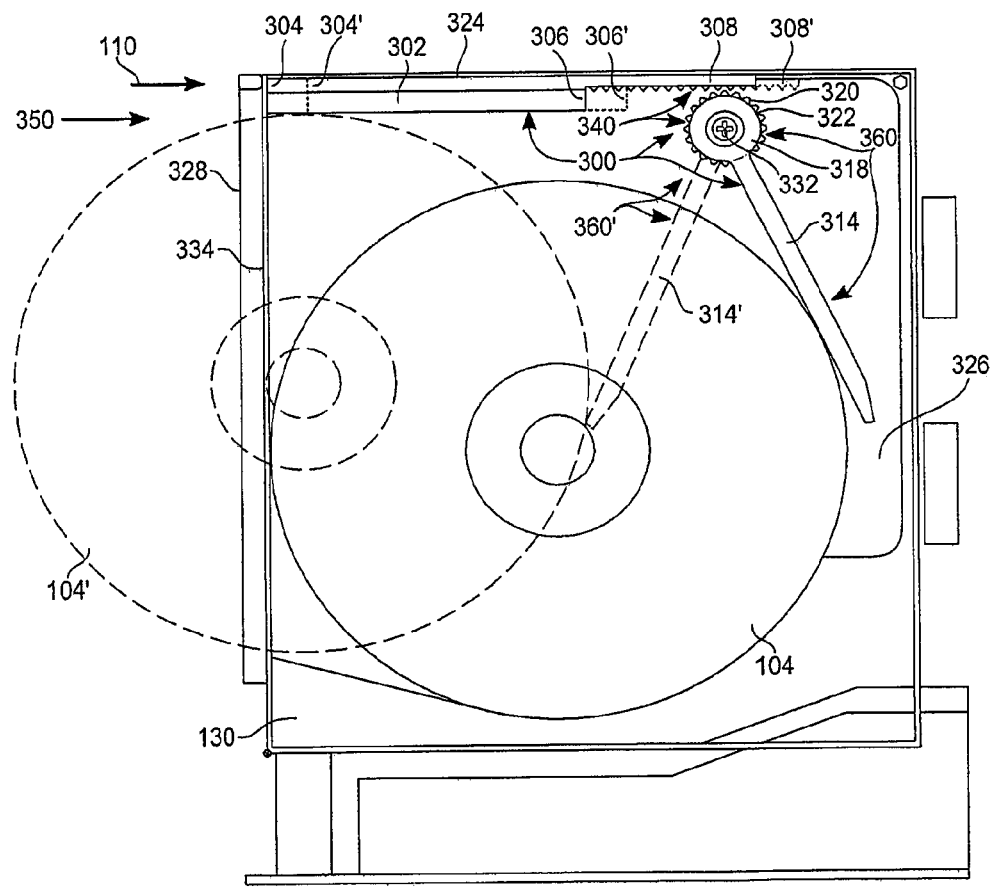
FIG. 3 is a top view of another preferred embodiment of the optical disk cassette with disk eject mechanism. The transfer portion of the disk eject mechanism is a rack and a pinion. Solid lines depict the disk accepting state, while dashed lines depict the disk ejecting state.

FIG. 3 shows another preferred embodiment of an optical disk cassette 350 with a disk eject mechanism 300. The disk accepting state is depicted in solid lines and the disk ejecting state is depicted in dashed lines. The transfer portion 340 of the disk eject mechanism 300 is a rack 308 and a pinion 320. The rack extends from the transfer end 306 of the pushrod portion 304 of the disk eject mechanism. The pinion is at least a portion of a toothed gear, and is formed in the outer surface 322 of the bearing 318 of the kick-out portion 360. The rack has teeth facing and engaging the pinion.

The pushrod portion 302 of FIG. 3 moves with pushrod motion 110 similarly to how the pushrod portion 202 of FIG. 2 moves with pushrod motion 110. Pushrod motion of the pushrod portion 302 causes the rack 308 to move with linear motion parallel to pushrod motion 110. Since the teeth of the rack engage the teeth of the pinion 320, this linear motion of the rack from the disk accepting state of the rack 308 to the disk ejecting state of the rack 308', causes rotational motion of the pinion about the pivot point 332. Since the pinion is formed in the outer surface 322 of the bearing 318 of the kick-out portion 360, rotational motion of the pinion about the pivot point causes rotational motion of the kick-out portion 360 about the pivot point from the disk accepting position of the kick-out portion 360 to the disk ejecting position of the kick-out portion 360'. This results in the kick-out arm 314 moving from the disk accepting state of the kick-out arm 314 to the disk ejecting state of the kick-out arm 314', pushing the optical disk 104 from its position at rest within the cassette case 102, until the optical disk 104' is at least partially ejected.

Thus, the transfer portion 340 moves in response to pushrod motion 110 of the pushrod portion 302, and the kick-out portion 360 moves in response to motion of the transfer portion 340. The transfer portion 340 translates the pushrod motion 110 of the pushrod portion 302 to movement of the kick-out portion 360. Movement of the kick-out portion 360 is similar to movement of the kick-out portion 222.

It can thus be seen that a preferred embodiment of an optical disk cassette 100 with an integrated disk eject mechanism 200 protects the disk by enclosing it within a case, allows ejection of the disk by an actuator, for example within a disk changer, and allows ejection of the disk by a tool or a finger, for example so the user can replace the disk with another or place the disk elsewhere for long-term storage. To eject the disk, pushrod motion 110 of the pushrod portion 202 of a preferred embodiment shown in FIG. 1A causes the transfer portion 240 to translate motion to the kick-out portion 222, which rotates about a pivot point 132, pushing on an optical disk 104, thus ejecting the disk from the cassette case 102. Similarly, to eject the disk, pushrod motion 110 of the pushrod portion 302 of another preferred embodiment shown in FIG. 3 causes the transfer portion 340 to translate motion to the kick-out portion 360, which rotates about a pivot point 332, pushing on an optical disk 104, thus ejecting the disk from the cassette case 102.

Figure 4:
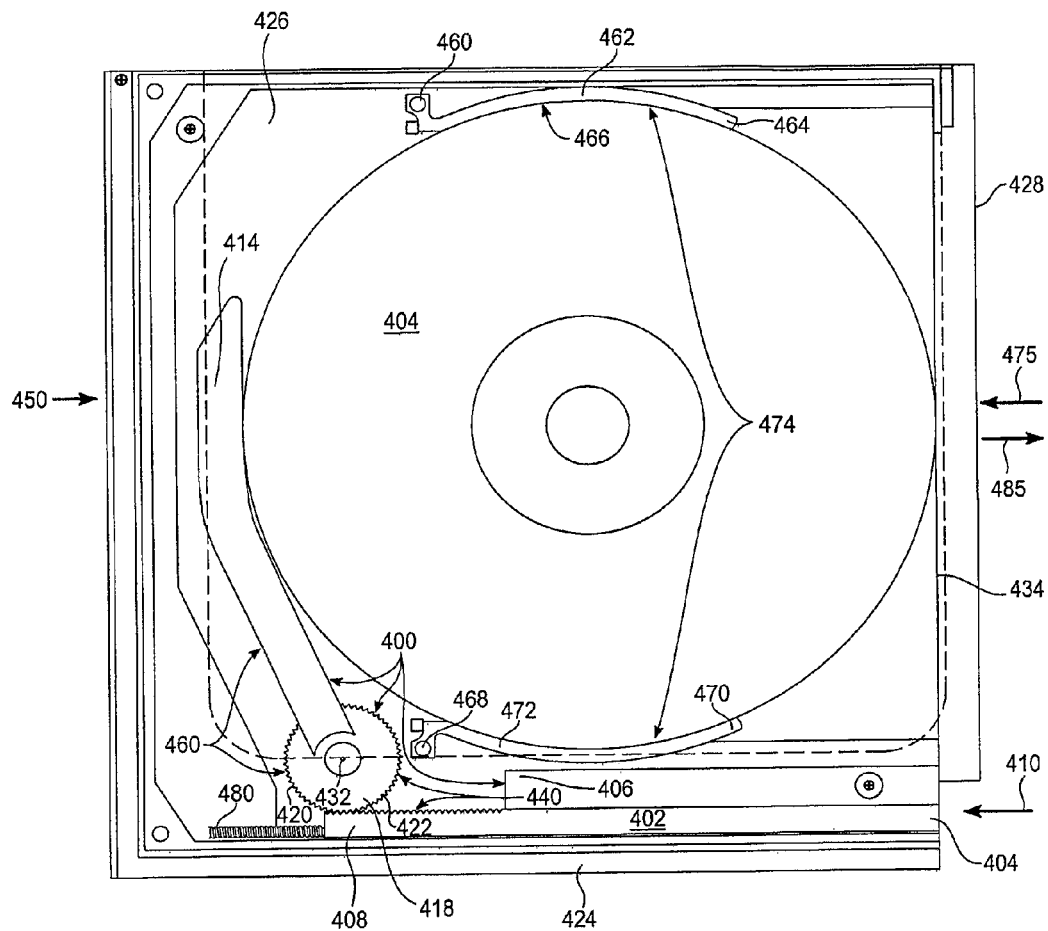
FIG. 4 is a top view of another preferred embodiment of the optical disk cassette with disk eject mechanism. A disk retention device assists during insertion, retention and ejection of the optical disk. A spring places the disk eject mechanism in a disk accepting state.

FIG. 4 shows a preferred embodiment of an optical disk cassette 450 with a disk eject mechanism 400. Also included is a disk retention device 466. The transfer portion 440 of the disk eject mechanism 400 is a rack 408 and a pinion 420. The rack extends from the transfer end 406 of the pushrod portion 402 of the disk eject mechanism. The pinion is at least a portion of a toothed gear, and is formed in the outer surface 422 of the bearing 418 of the kick-out portion 460. The rack has teeth facing and engaging the pinion. The kick-out arm 414 has an angled or curved shape that differs slightly from the kick-out arm 314 of the embodiment shown in FIG. 3. Other shapes for a kick-out arm may be devised. Operation of the optical disk cassette 450 with a disk eject mechanism 400 is similar to that of the embodiment shown in FIG. 3.

In the embodiment shown in FIG. 4, a spring 480 is added to oppose pushrod motion 410 of the pushrod portion 402. Inside the cassette case 426, the spring may be attached proximate to and pressing on the end of the rack 408, directly or indirectly coupled to the pushrod portion, or it may be attached in another location or act upon another part of the disk eject mechanism 400. The spring assists the pushrod or other part and acts to place the disk eject mechanism 400 in a disk accepting state, or restore the disk eject mechanism 400 to a disk accepting state after ejecting a disk. Instead of a spring, a resilient member or other mechanism for opposing pushrod motion of the pushrod portion or otherwise restoring the disk eject mechanism to a disk accepting state may be used. In embodiments without a spring, insertion of the disk may push a kick-out arm out of a seating area, thus placing the kick-out arm in a disk accepting state and the kick-out portion or kick-out device in a disk accepting position. The remainder of the disk eject mechanism moves in response to motion of the kick-out arm and is also placed in a disk accepting state.

Referring further to the embodiment shown in FIG. 4, a disk retention device 466, having a retainer 462, or alternatively a disk retention device 474, having a first retainer 462 and an opposite second retainer 472, assists during optical disk 404 insertion, retention and ejection. The retainer 462 is compliant, flexible or resilient or has a flexible region, and has a fixed end 460 attached within the cassette case. The opposing, free end 464 of the retainer slidably contacts the peripheral or circumferential edge of the optical disk 404 during optical disk insertion, retention or ejection, exerting a force upon this edge. The second retainer 472 has a fixed end 468 attached within the cassette case and an opposing free end 470, and operates similarly to the first retainer. In this embodiment, the fixed ends of the respective retainers are mounted away from the disk entry/exit slot 428, so that the free ends of the respective retainers are closer to the disk entry/exit slot and the front edge 434 of the cassette case 426. Retainers are attached near opposite side edges of the cassette case, locating the disk retention device in or near the seating area of the cassette case. The retainers may be curved, conforming to a portion of the peripheral edge of the optical disk and contacting the optical disk during optical disk retention. Differing attachment locations, shapes, orientations, mechanisms for displacement, numbers of retainers, mechanisms or methods for contacting the edge of the optical disk may be devised. For example, the first and second retainers may be separate or joined and the free end of a retainer may make sliding, rolling or grooved contact with the edge of the optical disk. A flexible region may be between the fixed end and the free end of the retainer, or the retainer may opposably displace by other means such as a spring. A retainer may be made as a continuous piece and of plastic.

When the optical disk 404 is being inserted or ejected through the disk entry/exit slot 428, the disk retention device 466 or 474 displaces and at first resists or opposes as it flexes. As the full diameter of the optical disk is impressed upon the disk retention device, which reaches maximum flexure, an equilibrium condition is reached. When the optical disk is displaced to either side of this equilibrium, the disk retention device, exerting a force upon the edge of the optical disk, urges the disk onward. Thus, during insertion of the optical disk, when the optical disk is pushed past this equilibrium in an insertion direction 475, the disk retention device urges the optical disk in the insertion direction and into the cassette case 426, and then removably retains the optical disk. During ejection of the optical disk, when the optical disk is pushed past this equilibrium in an ejection direction 485, for example by a disk ejection mechanism 400, the disk retention device urges the optical disk in the ejection direction and out of the cassette case. The disk retention device provides a non-motorized load, retention and eject mechanism, with few parts, for an optical disk cassette. Alternatively, the disk retention device may be used in an other storage container for optical disks, such as a cabinet, bin, drawer, tray, shelf, carry case or box, or in an optical disk drive or a disk changer.

Using the disk retention device 466 or 474 in an optical disk cassette 450 may allow a smaller cassette case 426 without a ramp, curved seat or seat extension. A reduced height of such an embodiment of an optical disk cassette may allow the optical disk cassette and an optical disk changer making use of the optical disk cassette to fit in a lower profile housing, for example a 4U enclosure. The disk retention device may help define the seating area in an optical disk cassette. Additionally, the disk retention device may help align the optical disk within the cassette case for repeatability in optical disk transfer between the cassette case and a read/write unit in an optical disk system.

Embodiments of the optical disk cassette 100, 350 or 450 or other preferred embodiments provide a built-in eject mechanism, allow the optical disk to be replaceable, and do not require a mechanism to reach inside the cassette to grab and remove an optical disk. Generally, in designing a system using multiple optical disks as a disk changer, the use of cassettes or cartridges can protect the disks, and there are the following options to consider.

Option #1: The optical disk does not leave the cartridge during reading or writing. Here, there is complexity involved in bringing a drive mechanism and a read/write mechanism to the disk, and the need for a shutter in the cartridge case for disk access. The disk is either not replaceable or there is additional complexity involved allowing replaceability.

Option #2: A passive cassette, which has a mechanism that can reach inside and grab a disk to remove it. Here, there is a high risk of damage to the optical disk.

Option #3: An active cassette, which has a built-in eject mechanism.

The embodiments shown herein satisfy Option #3, and minimize risk of machine damage to the optical disk while also allowing replaceability. The optical disk cassette may be used for long-term storage of an optical disk when it is not being used in a disk changer, thus minimizing risk of damage from human handling of the bare disk as well.

What is claimed is:

1. An optical disk cassette comprising:
 a cassette case configured to house an optical disk, said cassette case having opposed front and back edges and opposed first and second side edges, the front edge having a disk entry/exit slot; and
 a disk elect mechanism having:
 (a) a pushrod portion partially exposed and slidably connected to said cassette case to accommodate a pushrod motion parallel to the first side edge;
 (b) a kick-out portion within the cassette case, the kick-out portion having a disk accepting position, a disk ejecting position and a range of motion including the disk accepting position and disk electing position, the disk accepting position being such that when the optical disk is fully inserted into the cassette case the kick-out portion resides between the optical disk and at least one edge of the cassette case other than the front edge; and
 (c) a transfer portion responsive to the pushrod motion, the kick-out portion being responsive to a motion of the transfer portion, and the transfer portion translating the pushrod motion to movement of the kick-out portion through the range of motion;
 wherein:
 the disk eject mechanism is a unitary body having the pushrod portion, the transfer portion and the kick-out portion as portions thereof;
 the transfer portion includes a resilient member, and the resilient member of the transfer portion is a joining elbow of a resilient material;
 the kick out portion pivots at a pivot point and has a bearing pivotally mounting the kick-out portion at a pivot point and accommodating movement of the kick-out portion through the range of motion;
 the pushrod portion has a push end and a transfer end;
 the bearing of the kick-out portion has an outer surface; and
 the joining elbow extends from the transfer end of the pushrod portion and forms an elbow bend, the elbow bend opposing the transfer end of the pushrod portion, the joining elbow further extending from the elbow bend and joining the kick-out portion at the outer surface of the bearing.

2. The optical disk cassette of claim 1, wherein the bearing is a plain bearing.